United States Patent [19]

Omura

[11] Patent Number: 5,235,615
[45] Date of Patent: Aug. 10, 1993

[54] SPREAD SPECTRUM METHOD

[75] Inventor: Jimmy K. Omura, Cupertino, Calif.

[73] Assignee: Cylink Corporation, Sunnyvale, Calif.

[21] Appl. No.: 915,741

[22] Filed: Jul. 21, 1992

Related U.S. Application Data

[63] Continuation of Ser. No. 703,095, May 22, 1991, abandoned.

[51] Int. Cl.$^5$ .............................................. H04K 1/00
[52] U.S. Cl. ......................................... 375/1; 380/34; 370/18; 379/59; 455/33.1
[58] Field of Search ................ 375/1; 380/34; 379/59, 379/61, 63; 455/33.1, 51, 57; 370/18, 19, 20, 21, 22

[56] References Cited

U.S. PATENT DOCUMENTS

| | | |
|---|---|---|
| 3,831,013 | 8/1974 | Alsup et al. . |
| 3,900,721 | 8/1975 | Speiser et al. . |
| 4,112,372 | 9/1978 | Holmes et al. . |
| 4,222,115 | 9/1980 | Cooper et al. . |
| 4,238,850 | 12/1980 | Vance . |
| 4,247,942 | 1/1981 | Hauer . |
| 4,392,232 | 7/1983 | Andren et al. . |
| 4,418,393 | 11/1983 | Zscheile, Jr. . |
| 4,418,425 | 11/1983 | Fennel, Jr. et al. . |
| 4,425,642 | 1/1984 | Moses et al. . |
| 4,455,651 | 6/1984 | Baran . |
| 4,471,164 | 9/1984 | Henry . |
| 4,479,226 | 10/1984 | Prabhu et al. . |
| 4,512,013 | 4/1985 | Nash . |
| 4,523,311 | 6/1985 | Lee et al. . |
| 4,553,130 | 11/1985 | Kato . |
| 4,563,774 | 1/1986 | Gloge . |
| 4,570,265 | 2/1986 | Thro .................................. 375/1 X |
| 4,606,039 | 8/1986 | Nicolas et al. . |
| 4,612,415 | 9/1986 | Zdunek et al. .................... 379/59 X |
| 4,612,637 | 9/1986 | Davis et al. . |
| 4,617,674 | 10/1986 | Mangulis et al. ......................... 375/1 |
| 4,621,365 | 11/1986 | Chiu . |
| 4,647,863 | 3/1987 | Skudera, Jr. et al. . |
| 4,649,549 | 3/1987 | Halpern et al. . |
| 4,653,069 | 3/1987 | Roeder . |
| 4,660,164 | 4/1987 | Leibowitz . |

(List continued on next page.)

OTHER PUBLICATIONS

M. K. Simon, J. K. Omura, R. A. Scholtz, & B. K. Levitt, *Spread Spectrum Communications*, vol. 1, pp. 1–39, Rockville, Md.: Computer Science Press, 1985.

M. K. Simon, J. K. Omura, R. A. Scholtz & R. K. Lev- (List continued on next page.)

*Primary Examiner*—Tod R. Swann
*Attorney, Agent, or Firm*—David Newman & Associates

[57] ABSTRACT

A method for establishing and communicating synchronous, code division multiple access communications between a base station and a plurality of remote units. A plurality of remote-communications signals which have spread-spectrum modulation are transmitted from the plurality of remote units and arrive simultaneously at the base station. The method includes transmitting repetitively from the base station a access signal having spread-spectrum modulation and receiving the access signal at an accessing-remote unit. The accessing-remote unit transmits an echo signal which has spread-spectrum modulation. The echo signal is received at the base station and a time delay is measured between the access signal and the received echo signal. A protocol signal which has spread-spectrum modulation is transmitted to the accessing-remote unit, with the protocol signal communicating a chip codeword and the time delay measured at the base station. The accessing-remote unit adjusts a delay time such that the communications signal transmitted from the accessing-remote unit arrives simultaneously at the base station with communications signals transmitted from the plurality of remote units. The base station communicates to the plurality of remote units, with a plurality of base-communications signals. Each chip codeword of each base-communications signal is orthogonal to chip codewords of the plurality of base-communications signals.

The plurality of remote-communications signals arrive simultaneously at the base station with each chip codeword of each remote-communications signal orthogonal to chip codewords of the plurality of remote-communications signals.

13 Claims, 2 Drawing Sheets

U.S. PATENT DOCUMENTS

| | | |
|---|---|---|
| 4,672,605 | 6/1987 | Hustig et al. . |
| 4,672,629 | 6/1987 | Beier . |
| 4,672,658 | 6/1987 | Kavehrad et al. . |
| 4,675,839 | 6/1987 | Kerr . |
| 4,680,785 | 7/1987 | Akiyama et al. . |
| 4,691,326 | 9/1987 | Tsuchiya . |
| 4,697,260 | 9/1987 | Grauel et al. . |
| 4,703,474 | 10/1987 | Foschini et al. . |
| 4,707,839 | 11/1987 | Andren et al. . |
| 4,718,080 | 1/1988 | Serrano et al. . |
| 4,730,340 | 3/1988 | Frazier, Jr. . |
| 4,742,512 | 5/1988 | Akashi et al. . |
| 4,757,495 | 7/1988 | Decker et al. . |
| 4,759,034 | 7/1988 | Nagazumi . |
| 4,789,983 | 12/1988 | Acampora et al. . |
| 4,799,253 | 1/1989 | Stern et al. . |
| 4,805,208 | 2/1989 | Schwartz . |
| 4,807,222 | 2/1989 | Amitay . |
| 4,837,802 | 6/1989 | Higashiyama et al. . |
| 4,843,350 | 6/1989 | Nazarathy et al. . |
| 4,843,586 | 6/1989 | Nazarathy et al. . |
| 4,850,036 | 7/1989 | Smith . |
| 4,860,307 | 8/1989 | Nakayama . |
| 4,866,732 | 9/1989 | Carey et al. . |
| 4,894,842 | 1/1990 | Broekhoven et al. . |
| 4,901,307 | 2/1990 | Gilhousen et al. . |
| 4,914,651 | 4/1990 | Lusignan . |
| 4,922,506 | 5/1990 | McCallister et al. . |
| 4,930,140 | 5/1990 | Cripps et al. . |
| 4,932,037 | 6/1990 | Simpson et al. . |
| 4,969,159 | 11/1990 | Belcher et al. . |
| 4,977,577 | 12/1990 | Arthur et al. . |
| 4,977,578 | 12/1990 | Ishigaki et al. . |
| 5,005,169 | 4/1991 | Bronder et al. . |
| 5,016,255 | 5/1991 | Dixon et al. . |
| 5,016,256 | 5/1991 | Stewart . |
| 5,022,047 | 6/1991 | Dixon et al. . |
| 5,023,887 | 6/1991 | Takeuchi et al. . |
| 5,029,181 | 7/1991 | Endo et al. . |
| 5,040,238 | 8/1991 | Comroe et al. . |
| 5,048,052 | 9/1991 | Hamatsu et al. . |
| 5,056,109 | 10/1991 | Gilhousen et al. . |
| 5,103,459 | 4/1992 | Gilhousen et al. ............ 375/1 |

OTHER PUBLICATIONS itt *Spread Spectrum Communications,* vol. 3, pp. 346–407, Rockville, Md.: Computer Science Press, 1985.

R. A. Scholtz, "The Origins of Spread-Spectrum Communications", *IEEE Trans. Commun.* COM-30, No. 5, pp. 822–854, May 1982.

R. L. Pickholtz, D. L. Schilling & L. B. Milstein "Theory of Spread-Spectrum Communications-A Tutorial", *IEEE Trans Commun.,* COM-30, No. 5, pp. 855–884, May 1982.

R. A. Scholtz, "Notes on Spread-Spectrum History", *IEEE Trans. Commun.* COM-31, No. 1, pp. 82–84, Jan. 1983.

R. Price, "Further Notes and Anecdotes on Spread-Spectrum Origins", *IEEE Trans. Commun.,* COM-31, No. 1, pp. 85–97, Jan. 1983.

M. Kavehrad, "Performance of Nondiversity Receivers for Spread Spectrum in Indoor Wireless Communications", *AT&T Technical J.,* vol. 64, No. 6, pp. 1181–1210, Jul.-Aug. 1985.

M. Kauehrad & P. J. McLane, "Spread Spectrum for Indoor Digital Radio", *IEEE Commun. Mag.* vol. 25, No. 6, pp. 32–40 Jun. 1987.

M. Kavehrad & G. E. Bodeep, "Design and Experimental Results for a Direct-Sequence Spread-Spectrum Radio Using Differential Phase-Shift Keying Modulation for Indoor, Wireless Communications", *IEEE Trans. Commun.,* SAC-5, No. 5, pp. 815–823, Jun. 1987.

000
SPREAD SPECTRUM METHOD

RELATED PATENTS

This application is a continuation of application Ser. No. 07/703,095, filed May 22, 1991 now abandoned.

BACKGROUND OF THE INVENTION

This invention relates to a code division multiple access (CDMA) spread spectrum system, and more particularly to a method for establishing communications in a personal communications network.

DESCRIPTION OF THE RELEVANT ART

While prior art CDMA spread spectrum systems, such as one being developed by QUALCOM, use time synchronization, the design is not very sensitive to how accurately this is done. Basically the chip codewords are randomized so that the radio receiving the transmitted signal using chip code, x, experiences the equivalent noise variance, $N_1$ due to M-1 interference signals as $$N_1 = (M-1)L$$

and the total sum of such noise variance terms among all radios is $$\sum_{m=1}^{M} N_m = ML(M - 1)$$

For the case M=L this results in non-zero interference compared to the use of orthogonal codewords which give zero interference. Such a prior art system clearly is not optimum for the case where M=L. For M>>L, however, the difference between the prior art system interference and the lower bound by Welch (1974) is quite small.

In their cellular radio system QUALCOM assumes that the number of users M is much larger than the code length L and to overcome the interference they use strong error correction coding that gives 5 dB of coding gain and voice activation which accounts for an additional 5 dB. Together this is about 10 dB of gain.

Because the cellular cells are quite large, there are typically multipath signals with delay differences larger than a chip time interval. QUALCOM apparently uses an adaptive RAKE type receiver that coherently combines multipath components. This improves the overall performance for the cellular radios.

OBJECTS OF THE INVENTION

A general object of the invention is a high capacity microcell using spread spectrum modulation.

An object of the present invention is a method for establishing communications using spread spectrum modulation in a personal communications network.

Another object of the present invention is a CDMA spread spectrum communications system where all signals from mobile units arrive at a base station within a fraction of a chip time interval.

A further object of the present invention is a CDMA spread spectrum communications system which uses orthogonal chip codes which have a cross correlation of zero.

SUMMARY OF THE INVENTION

According to the present invention, as embodied and broadly described herein, a method is provided for establishing and communicating synchronous, code division multiple access communications between a base station and a plurality of remote units. A plurality of remote-communications signals which are modulated with spread-spectrum and which use the same carrier frequency as the base station, is transmitted from the plurality of remote units and arrive simultaneously within a fraction of a chip time interval at the base station.

The method for establishing communications for each remote unit comprises the steps of transmitting repetitively from the base station an access signal which is modulated with spread-spectrum. The access signal is received at an accessing-remote unit. The accessing-remote unit is a remote unit which desires to establish communications with the base station. After receiving the access signal, the accessing-remote unit transmits an echo signal which is modulated with spread-spectrum. The base station receives the echo signal and measures a time delay from when the access signal was transmitted and the echo signal is received.

A protocol signal, which is modulated with spread-spectrum, is transmitted from the base station to the accessing-remote unit. The protocol signal communicates to the accessing-remote unit a chip codeword and the time delay measured at the base station. Upon receiving the protocol signal at the accessing-remote unit, the accessing-remote unit adjusts a delay time such that the communications signal transmitted from the accessing-remote unit arrives simultaneously at the base station with communications signals transmitted from the plurality of remote units. The delay time is adjusted relative to the access signal which is repetitively transmitted from the base station. The chip codeword is used by the accessing-remote unit for communicating with the base station.

The base station communicates to the plurality of remote units with a plurality of base-communications signals which are modulated with spread-spectrum and transmitted simultaneously and on the same carrier frequency from the base station. Each of the base-communications signals has its own unique chip codeword. Each chip codeword of each base-communications signal is orthogonal to other chip codewords used by the plurality of base-communications signals.

The plurality of remote units communicates to the base station with the plurality of remote-communications signals, respectively, which are modulated with spread-spectrum. The plurality of remote-communications signals, which use the same carrier frequency, are transmitted from the plurality of remote units, respectively, so that the plurality of remote-communications signals arrive simultaneously at the base station. Each chip codeword of each remote-communications signal is orthogonal to chip codewords of the plurality of remote-communications signals. Each of the remote-communications signals has its own unique chip codeword. For a particular two-way communications channel between a particular mobile using and the base station, the unique chip codeword used for the base-communications signal and the remote-communications signal, respectively, may be the same.

Additional objects and advantages of the invention will be set forth in part in the description which follows, and in part will be obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings which are incorporated in and constitute a part of this specification, illustrate particular embodiments of the invention, and together with the description, serve to explain the principles of the invention.

DETAILED DESCRIPTION OF THE PREFERRED EMBODIMENTS

Figure 1:
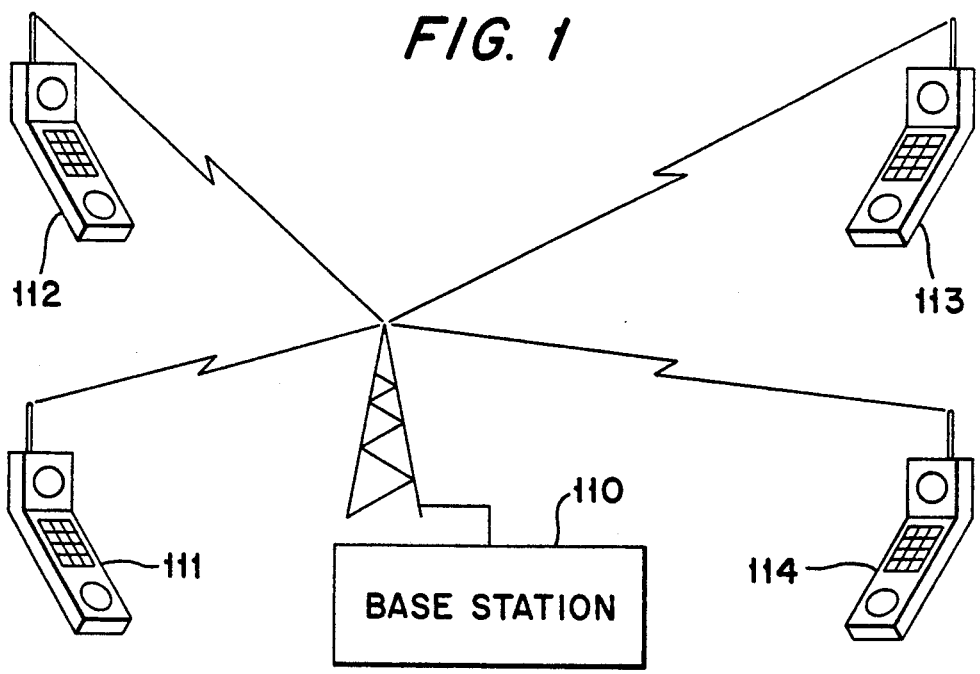
FIG. 1 illustrates a base station and a plurality of remote unit.

The invention disclosed in the patent application is related to U.S. patent application Ser. No. 07/528,020, filed on May 24, 1990 by J. K. Omura and D. Avidor, and entitled "METHOD AND APPARATUS FOR MODULATION AND DEMODULATION OF SPREAD SPECTRUM SIGNALS," which is incorporated herein by reference.

Reference will now be made in detail to the present preferred embodiments of the invention, an example of which is illustrated in the accompanying drawings, wherein like reference numerals indicate like elements throughout the several views.

A preferred embodiment of the present invention, as shown in FIG. 1, includes a base station 110 and a plurality of remote units, illustrated, by way of example, as first, second, and third remote units 111, 112, 113. The base station 110 includes spread spectrum transmitters and receivers, and appropriate processors for implementing the methods of the present invention. Each of the plurality of remote units 111, 112, 113 includes a spread spectrum transmitter, a spread spectrum receiver and an appropriate processor. With current technology, a digital signal processor may implement the method of the present invention at each remote unit. A remote unit may be embodied as a wireless telephone, radio paging device, computer terminal, or any other voice, video or data device with appropriate circuitry for implementing the present invention.

As a preferred embodiment, the present invention can use the 902 MHz to 928 MHz ISM band where there are 10 non-overlapping frequency sub-bands of 2.6 MHz each. Each of the 2.6 MHz bands can have up to 16 simultaneous spread spectrum signals where each uses a different orthogonal spreading chip sequence of 16 chips. In this example, time division duplexing, (TDD) is used to achieve full duplex 32 Kbps data rate in both direction on the same carrier frequency. The present invention illustrates how spread spectrum radios are used to make a high capacity microcell and how a collection of such microcells work together.

Typically, in a frequency division multiple access (FDMA) microcell the spread spectrum radios use several non-overlapping sub-bands, but the entire system overlays on the total available frequency band. In the ISM band from 902 MHz to 928 MHz, for example, there is a total bandwidth of 26 MHz. With direct sequence/binary phase shift keying (DS/BPSK) personal communication service (PCS) radios, which each require 2.6 MHz, 10 non-overlapping full duplex FDMA spread spectrum radio channels are available in this band. Thus, several non-interfering channels exist due to frequency separation. Where there is simultaneous use of the same frequency in the microcell, a code division multiple access (CDMA) system uses orthogonal chip sequences. Thus we have an FDHA overlay on CDMA channels.

The present invention for a microcell has several unique features which are designed to allow more radios per microcell and to minimize interference among the radios in a collection of microcells. The results can readily be generalized.

The Spread Spectrum Digital Radio

The present invention uses conventional direct sequence binary phase shift keyed (DS/BPSK) modulation with a fixed spreading sequence used for each data bit. This is the best known and most widely used commercial spread spectrum radio modulation. There are many ways, however, to design the receiver for DS/BPSK radios.

One implementation of the basic radio can use 32 kbps ADPCM to digitize voice in a PCS application. As an example, 16 chips per bit can be used as the spreading sequence resulting in 512 chips per second. With the use of time division duplexing (TDD) and some time guard band between bursts, the bandwidth of each radio signal is 2.6 MHz.

One unique feature of the receiver for DS/BPSK is the use of digital matched filters implemented in the manner described in the U.S. patent application Ser. No. 07/528,020. For the DS/BPSK system 8-bit samples are most likely used with five samples per chip. Alternatively, a delta modulation variation of this digital matched filter can be used as described in the paper "A Proposal of New Detector Scheme Using Delta Modulation Type Digital Matched Filter for Direct-Sequence Spread-Spectrum Communication System" by Hisao Tachika and Tadashi Fujino of Mitsubishi Electric Corporation presented at the 1990 International Symposium on Information Theory and Its Applications in Hawaii on Nov. 27–30, 1990.

Another feature is the open loop type phase and frequency tracking module which acquires and tracks the phase and frequency of the received signal. The phase and frequency tracking module allows the receiver to adjust its own oscillator to match the frequency of the received signal. In the microcell system of the present invention, the base station radios serve as master radios, and are assumed to have a very accurate frequency and time reference. The remote units, which may be embodied as mobile telephone radios, are slave to the corresponding base station master radios. The slave radios lock onto the master radio carrier frequency and use the master radio signal for establishing its time reference.

The present invention uses time division duplexing (TDD), also called the "ping pong" protocol, to achieve full duplex operation using the same frequency. This is an old idea used in some modems and it is currently used in the new cordless telephones, denoted CT-2, in England. TDD reduces the radio complexity by using only one radio frequency section for both transmission and reception rater than the method of using two frequency bands, one for transmission and one for reception, as used in cellular radios.

With TDD the master radio at the base station controls all timing with the corresponding slave radio in the remote unit. The slave radio at the remote unit transmits its bursts at a fixed delay from the end of the master radio's bursts. The fixed time delay is determined by the master radio.

The invention includes a method for establishing and communicating synchronous, code division multiple access (CDMA) communications between the base station 110 and the plurality of remote units. A plurality of remote-communications signals which are modulated with spread-spectrum and have the same carrier frequency, is assumed to be transmitted from each of the plurality of remote units. A remote-communications signal communicates information from each remote unit to the base station 110. The timing for transmitting the remote-communications signals is adjusted so that all the remote-communication signals arrive simultaneously at the base station 110. Each of the plurality of remote units initially was set in proper synchronization prior to communicating with the base station 110.

Figure 2:
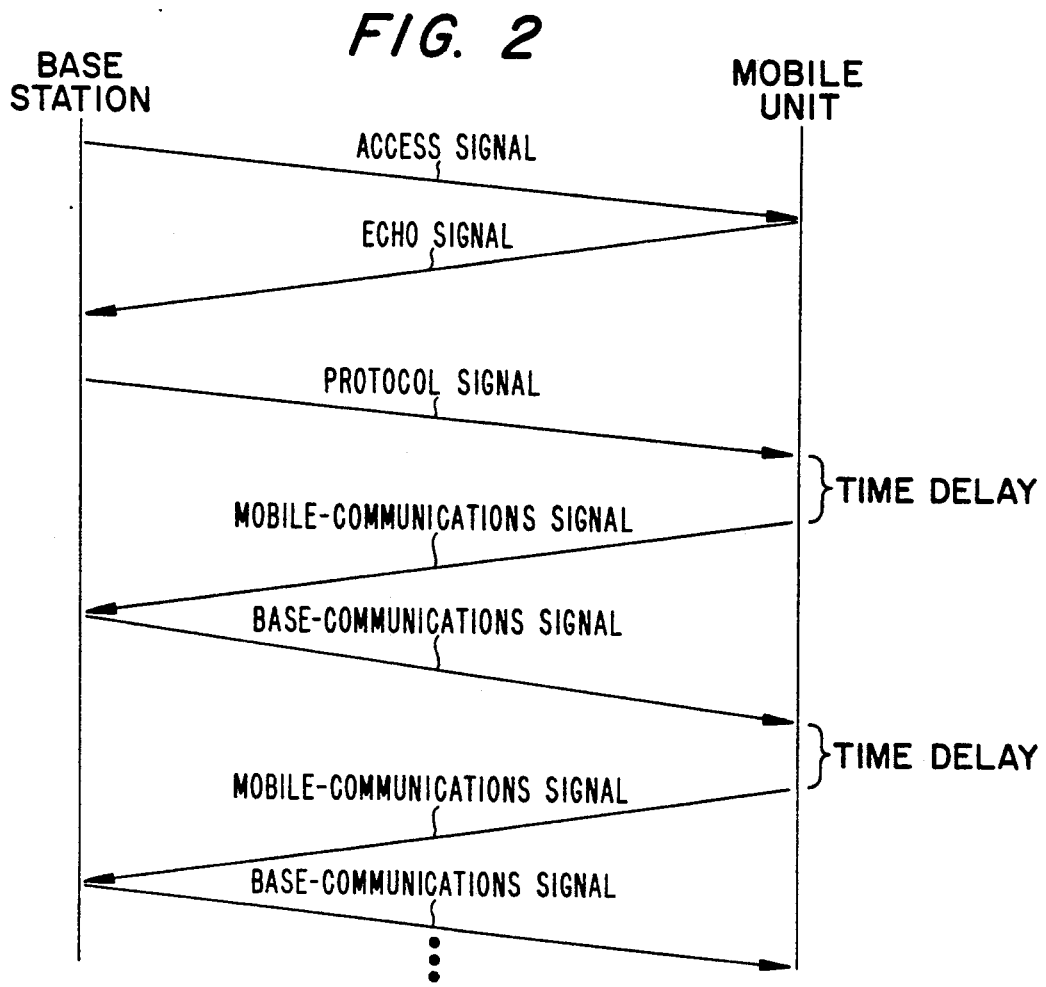
FIG. 2 illustrates the sequence of signals of the present invention.

As illustratively shown in FIG. 2, the method for establishing communications and setting proper synchronization for each remote unit comprises the steps of transmitting repetitively from the base station 110 an access signal which is modulated with spread-spectrum. The access signal may use the same or a different carrier frequency from that used by the plurality of remote units. The carrier frequency and chip codeword of the access signal are known to all remote units which can communicate with the base station 110. Each remote unit may have a receiver dedicated for listening to and receiving the access signal. Alternatively, each remote unit may have a receiver which is set initially to listen to the access signal, and which adapts to a different chip codeword after communications is established with the base station.

A chip codeword generator, by way of example, can have shift registers with taps set to match the spread spectrum chip codeword of the access signal. The taps of the shift registers can be reset to match a spread spectrum chip codeword of a remote-communications signal or a base-communications signal.

The access signal is received at an accessing-remote unit 114. The accessing-remote unit 114 is the remote unit desiring to establish communications with the base station 110. After receiving the access signal, the accessing-remote unit 114 transmits an echo signal which is modulated with spread-spectrum. The base station 110 receives the echo signal and measures a time delay from when the access signal was transmitted and the echo signal is received. The echo signal may use the same chip codeword as was used by the access signal, or a different chip codeword. Typically, the same chip codeword is used for establishing communications with the base station 110.

A protocol signal, which is modulated with spread-spectrum, is transmitted from the base station 110 to the accessing-remote unit 114. The protocol signal communicates to the accessing-remote unit 114 a remote-chip codeword and the time delay measured at the base station. The protocol signal may use the same chip codeword as the access signal. The remote-chip codeword may be communicated by a codeword embedded in the protocol signal, which sets taps on shift registers in a chip-code generator in the accessing-remote unit 114, which generates the remote-chip codeword. Chip codes may also be stored in memory of the radios. The remote-chip codeword is used by the accessing-remote unit for communicating with the base station 110.

The time delay is measured from when the access signal was transmitted from the base station 110, to when the echo signal was received at the base station 110. The time delay is proportional to the distance the accessing-remote unit 114 is located from the base station 110.

Upon receiving the protocol signal at the accessing-remote unit 114, the accessing-remote unit 114 adjusts a delay time such that the communications signal transmitted from the accessing-remote unit 114 arrives simultaneously in time at the base station 110 with communications signals transmitted from the plurality of remote units. The delay time is adjusted relative to the access signal which is repetitively transmitted from the base station 110.

The base station 110 communicates to the plurality of remote units with a plurality of base-communications signals which are modulated with spread-spectrum and transmitted simultaneously and on the same carrier frequency from the base station 114. The plurality of base-communication signals are transmitted simultaneously in time with the access signal. Each of the base-communications signals has its own unique chip codeword. Each unique chip codeword of each base-communications signal is orthogonal to chip codewords used by the plurality of base-communications signal, and the access signal.

The plurality of remote units communicates to the base station 110 with the plurality of remote-communications signals which are modulated with spread-spectrum. The plurality of remote-communications signals, which use the same carrier frequency, are transmitted from the plurality of remote units, respectively, so that the plurality of remote-communications signals arrive simultaneously in time at the base station 110. The delay time for the remote-communications signal, transmitted from a particular remote unit, was set when the particular remote unit initially accessed and established communications with the base station 110. Thus, each remote unit has its own delay time, and is measured with respect to when the remote unit receives the access signal.

Each chip codeword of each remote-communications signal is orthogonal to chip codewords of the plurality of remote-communications signals. Each of the remote-communications signals has its own unique chip codeword. For a particular two-way communications channel between a particular remote unit and the base station 110, the unique chip codeword used for the base-communications signal and the remote-communications signal may be identical.

Thus, the base station 110 radios are timed together so that they send out their TDD bursts at the same time. Also, each remote unit, as a slave radio, receives all of the base-communications signals arriving together and separates the desired base-communications signal using its unique orthogonal chip sequence. Since the plurality of base-communications signals arrive at any particular remote unit at the same time, the spread spectrum receivers and processor at the particular remote unit can use orthogonal chip sequences to separate out the various signals from the plurality of base-communications signals, which are transmitted from the base station 110, to the plurality of remote units.

During initial acquisition an accessing-remote unit 114 can search for and acquire the base-communications signal with the chip sequence corresponding to an access channel. Once a slave radio of an accessing-remote unit 114 acquires the master radio of an access channel, it can begin the access protocol which includes the processor at the base station 110 determining the propagation time delay due to the distance of the accessing-remote unit 114 from the base station 110. The processor at the base station 110 assigns a frequency, code, and time delay to the accessing-remote unit 114 during this access protocol. The time delay is determined by the processor when it determines the propagation time delay between an accessing-remote unit and the base station 110, using well known ranging or echo techniques. Thus, the slave radios of the plurality of remote units have their transmission bursts timed to arrive at the base station within a fraction of a chip time interval. With this timing, the spread spectrum receivers and processor at the base station 110 can use orthogonal chip sequences to separate out the various spread spectrum signals from the plurality of remote-communications signals, which are transmitted from the plurality of remote units to the base station 110.

With TDD, the master radios at the base station 110, which have accurate frequency and time references, can tightly control all the slave radios of the remote units that are in the microcell. A slave radio locks onto the carrier frequency of one of the master radios and transmit its TDD bursts at some fixed time delay relative to the end of the master radio's TDD bursts.

The tight control that the microcell base station master radios has over the telephones slave radios of the remote units results in a system that can take advantage of orthogonal chip sequences to achieve higher overall capacity. Capacity is the number of active mobile telephone channels that can be accommodated by a microcell.

Continuous Update of Delay

The present invention also provides for continuously updating the time delay measured at the base station. Using a base station receiver, an output peak of the cross correlation of a received remote-communications-signal from a remote unit provides timing for tracking the time delay. The time measured by the cross correlation can be used to adjust the delay time such that the communication signal transmitted from the remote unit continuously arrives simultaneously at the base station with communications signals transmitted from the plurality of remote units, while the moving-remote unit moves a way from or toward the base station. The time delay can be measured by cross correlating the codeword of the moving-remote unit with a stored replica of the codeword at the base station. Accordingly, the delay time can be updated within a fraction of a chip interval, thereby providing accurate timing between the moving-remote unit and the base station.

Orthogonal Chip Sequences

To allow a large number or active radios in each microcell, an orthogonal set of spreading chip sequences is used. For chip sequences of 16 chips per bit, up to 16 radios can use one of the FDMA channels so long as all the radios are time synchronized such that each of the 16 radios have their spreading code sequences timed to arrive at the master radios at the base station of the microcell within a fraction of a chip time interval. This critical time synchronization allows orthogonal spreading sequences to be used so that the 16 radios will not interfere with each other.

Sixteen orthogonal spreading sequences of 16 chips in length is illustrated with the Hadamard matrices. Let $$H(1) = \begin{bmatrix} 1 & 1 \\ -1 & -1 \end{bmatrix}$$

and $$H(n) = \begin{bmatrix} H(n-1) & H(n-1) \\ H(n-1) & -H(n-1) \end{bmatrix}$$

for n=2, 3, 4. With this construction there are 16 rows of H(4) that are orthogonal sequences of length 16. Another way to obtain a set of orthogonal chip sequences of 16 chips in length is to use a maximal length sequence of period 15. Let c be any one period of the sequence where the values are +1 or −1 and $T^n c$ be the n cycle shift of c. The cross correlation is $$<T^n c, T^n c> = 15 \text{ for } n = 0, 1, 2, \ldots, 14$$

and $$<T^m c, T^n c> = -1 \text{ for } n \neq m.$$

A set of 16 orthogonal chip sequences of 16 chips in length is given by adding a "1" component to each of the 15 shifts of c and the vector of 16 "1s".

By synchronizing in time all the slave radios of the plurality of remote units it is possible to have 16 non-interfering wireless communication links for each of the 10 FDMA channels resulting in a total capacity of 160 wireless links per microcell. In this system the remote units, such as telephone radios, time their transmissions so that they all arrive at the base station synchronized to within a fraction of a chip time interval. These remote units also are locked in frequency to their corresponding base station master radios.

Access Channel

Two ways are described to achieve an access channel where a accessing-remote unit can initially synchronize its radio frequency and time reference and conduct communication before it places an outgoing call or while the accessing-remote unit is in a standby mode, a base station radio as a master radio, controls the average power of the mobile telephone slave radio, it is controlling.

Each base station radio is assumed to have two antennas for diversity. Besides keeping the time average power of the slave radio at some fixed level, if a short time drop in the power level is received from the slave radio of a remote unit then the master radio of the base station 110 switches to the alternate antenna. Power control is assumed to vary slowly and based on a long time average while the fading due to the slave radio passing through multipath nulls is handled by the antenna switching by the master radio.

Each slave radio has only one antenna. Antenna diversity is only done by the master radio using its two antennas.

Spread Spectrum CDMA Code Selection

High capacity PCN systems using spread spectrum radios requires careful choice of spread spectrum chip codewords and system time synchronization. A single carrier frequency in a single microcell forms a star network with base station 110 and remote units 111, 112, 113, 114. The radios all use spread DS/BPSK spectrum signals and TDD to achieve full duplex operation. Assume that the TDD bursts are synchronized among a plurality of base station radios which serve as master radios, to their corresponding remote units, which are slave radios. Here each master radio is paired with one slave radio to form a 32 kbps ADPCM voice channel.

Assume that there are M active slave radios transmitting simultaneously on one carrier frequency to the microcell base station master radios. Thus, a M radio signals are in the channel at any given time. There are alternating synchronized burst transmissions from the M slave radios and the M master radios.

The Welch Bound

Each spread spectrum radio has a chip codeword of length L. Suppose there are M radios where the Mth radio has a chip codeword denoted $$x_m = [x_{m1}, x_{m2}, x_{m3}, \ldots, x_{mL}]$$

where the kth chip, $x_{mk}$, is either $-1$ or 1. The set of M chip codewords from a code denoted $$\{x_1, x_2, x_3, \ldots, x_M\}$$

The cross correlation between the chip codewords determine the amount of interference any receiver has when there are M radios that are simultaneously transmitting in the same band. For example, the receiver that is trying to receive the transmitting radio using the first chip codeword, $x_1$, has an interference term from the transmitting radio using the second chip codeword, $x_2$, given by the cross correlation $$<x_1, x_2> = \sum_{k=1}^{L} x_{1k} x_{2k}$$

The total variance of all such interference terms gives a measure of the equivalent noise variance which to this receiver is $$N_1 = \sum_{n=2}^{M} <x_1, x_2>^2$$

Lloyd Welch of USC derived a bound on how small this total interference can be with any M chip codewords of length L. He found that the sum of all such equivalent noise variance terms is lower bounded by, $$\sum_{m=1}^{M} N_m = \sum_{m=1}^{M} \sum_{n \neq 1} <x_m, x_n>^2 \geq ML(M - L)$$

Note that for M=L the lower bound is zero. If orthogonal chip codewords were used then all the cross correlations would be zero and the lower bound would be achieved. In general it is possible to find M=L orthogonal chip sequences of length L.

Since the Welch bound is greater than zero for M>L this tells us that it is impossible to find more than L orthogonal chip sequences of length L.

System Time Synchronization

The Welch bound was derived for the special case where at any given receiver all the transmitted spread spectrum signals, the intended signal plus the M−1 interfering signals, arrive at the receiver time synchronized so that the chip codewords are lined up in time.

Since the master radios of the base station 110 are located together it is easy to time synchronize their transmissions so that all slave radios receive all M transmitted signals with their chip codewords arriving at the same time.

To synchronize the remotely scattered slave radios each master radio must control its corresponding slave radio so that all slave radio signals are time synchronized at the base station. Under this assumption the Welch bound applies.

Without time synchronization at the chip time level, it is not possible to get the kind of small interference suggested by the Welch lower bound. If the number of users M gets much larger that the chip code length L then the difference between having system time synchronization and not having it becomes small.

Chip Codes

One set of chip codes is described that has near optimal properties and seems to be particularly well suited for multiple microcell PCN applications.

Figure 3:
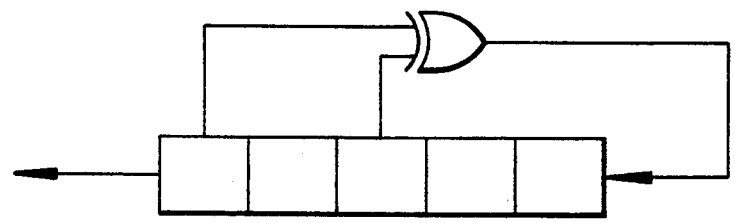
FIG. 3 shows a maximal length shift register.

A five register maximal length sequence generator with feedback taps from registers [3, 5] shown in FIG. 3 can be used to generate a binary sequence of length 31 which as some important properties.

Let s be the 31 bit sequence that is generated with the initial five register values of 11111. This sequence is given by $$s = [1111100011011101010000100101100]$$

and a cycle shift operator T on s is given by, $$Ts = [1111000110111010100001001011001]$$

All the 31 distinct cycle shifted sequences are $T^k$s for $k=0, 1, 2, \ldots, 30$.

Suppose that each of the 31 cycle shifted sequences are concatenated with a "0" to it and make a binary sequence of 32 bits in length and convert them into 31 chip codewords of 32 chips in length by changing each "0" bit "1" amplitude and each "1" bit to "−1" amplitude. Let the 31 chip code be denoted $$\{x_1, x_2, x_3, \ldots, x_{31}\}$$

Note that if chip codeword $x_2$ was constructed form Ts then $$x_2 = [-1, -1, -1, -1, 1, 1, 1, -1, -1, 1, -1, -1,\\ -1, 1, -1, 1, -1, 1, 1, 1, 1, -1, 1, 1, -1, 1, -1,\\ -1, 1, 1, -1, 1]$$

The interesting property of these converted maximal length sequences is that they are orthogonal. That is, $$<x_m, x_n> = 0 \text{ when } m \neq n$$

There are a total of six maximal length sequences generated by five register generators. Their feedback connections are given by [2,5], [4,5], [1,2,3,5], [1,2,4,5], [1,3,4,5] and [2,3,4,5].

Each of the six maximal length sequences of length 31 can form a chip code of 31 orthogonal codewords where each such codeword is 32 chips long. Thus, there are six codes consisting of a set of 31 orthogonal codewords. The cross correlation of codewords from different codes, however, are not necessarily orthogonal.

Because of the shifting property, each codeword from one code has the same set of cross correlation values when it is cross correlated with all the codewords of another chip code. In fact, if y is a codeword from one chip code and $\{x_1, x_2, x_3, \ldots, x_{31}\}$ is a set of codewords from any other chip code then the equivalent noise variance is $$\sum_{m=1}^{31} <x_m, y>^2 = 1024$$

Handoff From Microcell to Microcell

Suppose two adjacent microcells are being used where within a microcell the radios use orthogonal chip sequences. Orthogonality between any chip sequence of one microcell and a chip sequence from the other microcell is assumed not necessary.

In terms of timing between the two microcells, assume that both microcells have their TDD bursts synchronized to within a chip time interval. This synchronization can be maintained using a single radio channel between the two microcells making use of directional antennas between the two base stations.

Two basic ways are describe to allow a mobile telephone to be handed off from one microcell to another as the transitioning-remote unit roams around in an area covered by the two microcells.

The first technique assumes that each microcell base station has an extra set of radios that are searching for signals from mobile telephones that are linked to the other microcell. Since the two microcells use different set of orthogonal spreading chip sequences, the extra radios in one microcell can be searching for signals using the spreading chip sequences of the other microcell. If such a signal is detected and its signal strength exceeds a threshold, then this would indicate that the transitioning-remote unit is getting close to the base station of the microcell that has detected it. This microcell can initiate handoff of this mobile telephone from the other microcell to itself by using the radio link that connects the base stations of the two microcells. Since the base station radios control the mobile telephones through an in-band channel, the hand off of the mobile telephone from one microcell to another can be easily handled by the base stations of the two microcells.

This method requires that each microcell has extra radios at its base station that are searching for strong signals from mobile telephones that are active and linked to adjacent microcells. This is possible because each microcell is assumed to use a unique set of orthogonal chip sequences.

Rather than have extra radios at base stations of microcells, each mobile telephone unit can have a second receiver that searches for signals from adjacent microcells while it has an active call in session. This can be achieved with only the digital base band portion of the receiver if this search is to be limited to the same frequency as is currently being used by the active session.

The second method of establishing connection to a new microcell places the responsibility of finding a new microcell during roaming on the transitioning-mobile unit. This is similar to the initiation of handoff used by the receiver.

Each microcell is assumed to have a known unique set of spreading chip sequences. Each microcell may use a unique chip sequence for its access channels. Thus, any mobile telephone unit can search for different microcell access channels by using the unique chip sequences.

Performance With Two Microcells

Consider two adjacent microcells are denoted "A" and "B" where microcell A uses code $\{x_1, x_2, x_3, \ldots, x_{31}\}$ and microcell B uses another code $\{y_1, y_2, y_3, \ldots, y_{31}\}$. A remote unit is assumed to have slave radio established a voice link with microcell A's base station using codeword $x_1$. While it is receiving the TDD bursts from this base station it is also receiving interference signals from microcell B's base station. The performance of this radio is examined with this interference when the two codes used are the type described herein.

Let $P_A$ and $P_B$ be the power of the first base station and the second base station, respectively, at the radio using code $x_1$. For this case where the variance of the cross correlation terms is $$\sum_{n=1}^{31} <x_1, y_n>^2 = 1024$$

and the signal term is $(32)^2 = 1024$, the equivalent bit energy to noise ratio is given by $$E_b/N_o = P_A/P_B$$

Suppose a rate ½ convolutional code with constraint length $K=7$ is used, where each information bit is coded into two bits that form the 4-ary phase of a DS/QPSK system. For this system, the 32 chip spreading codes given above are used. A bit error probability of $10^{-3}$ requires $$E_b/N_0 = 3 \text{ dB}$$
$$= 2.$$

This can be achieved so long as $$P_A \geq 2P_B$$

If in addition all radios use voice activation circuits where the transmit power is turned off during silence in a voice conversation then on the average the interference is reduced to 35%. Thus a remote unit has a good voice communication channel even when the TDD bursts from the two base stations are of equal power at its location. In this case the remote unit is actually receiving 31 bursts signals from microcell A's base station. Since it is using one of the orthogonal 31 codewords, $x_1$, it does not get any interference from this microcell. The remote unit is also receiving 31 interference signals from microcell B's base station where these signals have codewords that are not orthogonal to $x_1$ and thus add equivalent noise to its channel. The boundary of all locations for the slave radio where its bit error rate is less than $10^{-3}$ approximately corresponds to the location where the power of the two microcell base station radios are equal.

Different Power Levels for each FDMA Channel

The 902-928 MHz band can have 10 FDMA channels each of 2.6 MHz of bandwidth. In each of these 2.6 MHz bandwidths channels spread spectrum signals are used with up to 16 simultaneous active calls. This is where the code length L=16 chips for 32 Kbps full duplex voice using TDD. For codes of length L=32 there are 5 channels of 5.2 MHz of bandwidth each.

Note that each of the 10 FDMA channels form an independent microcell whose range or radius is determined by the power of all radios using that particular carrier. Suppose, for example, that the carrier frequency of the 10 FDMA channels are denoted $f_1, f_2, \ldots, f_{10}$ where these are equally spaced in the 902-908 MHz band. Then one microcell may use power levels $P_1, P_2, \ldots, P_{10}$ for the different carriers and thus this microcell has different range radius for each of the different FDMA channels. Another microcell may use different power distribution for the 10 channels and thus it will have a different range radius for each of its 10 FDMA channels.

The use of different power levels for the different non-overlapping spread spectrum frequency bands will allow a greater flexibility of coverage of mobile telephones in a given area and facilitate handoff from one microcell to another. Consider two microcells in FIG. 4 where contours of a fixed power level to a slave radio are illustrated.

Figure 4:
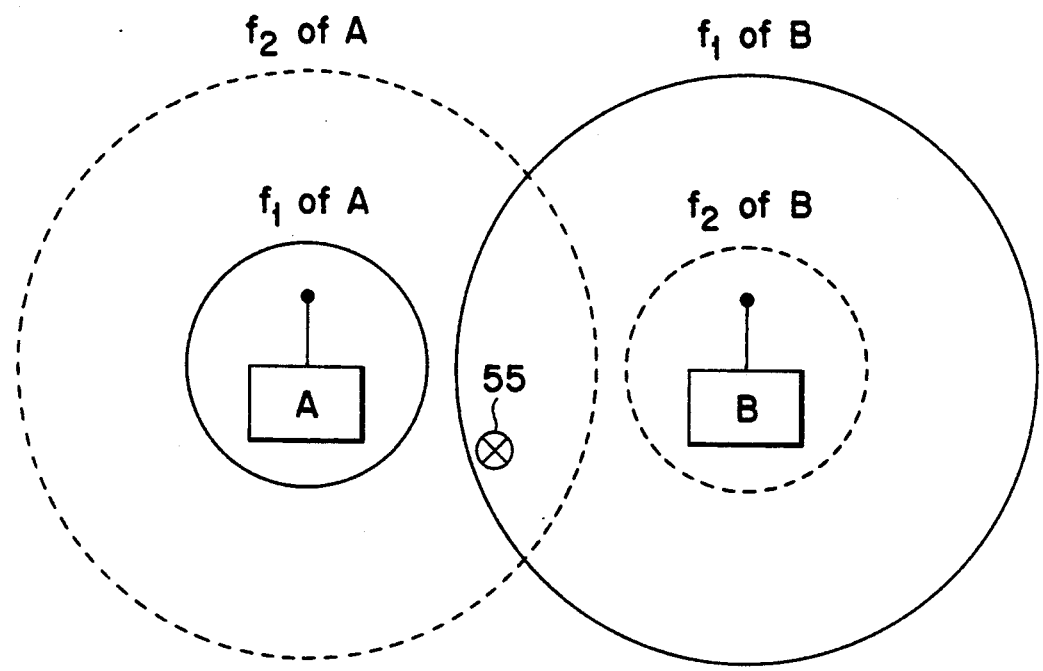
FIG. 4 illustrates a hand off geometry which can be used with the present invention.

Suppose microcell A uses low power in carrier $f_1$ while microcell B uses a much greater power for this same carrier. Then as shown in FIG. 4 microcell B has a much greater area coverage than microcell A. Next suppose that the for carrier $f_2$ the opposite is true. That is, microcell A uses much greater power at $f_2$ while microcell B uses little power at $f_1$. This is also shown in FIG. 4. This shows that a mobile telephone can always be covered by at least one band of one of the microcell while there is little interference between the signals coming from the two microcell to the remote unit since in a single band in the cell the fixed power level areas need not overlap.

Note that handoff of a mobile telephone from one microcell to another can be done more easily by merely switching frequencies. For example, suppose that a remote unit is at location 55 shown in the FIG. 4 and it is using carrier $f_1$ to link with microcell B. Note that it is not getting much interference from the same frequency channel of microcell A. As it roams and moves out of range of the $f_1$ carrier of microcell B, the remote unit can be handed off to microcell A using carrier $f_2$. After this switch to carrier $f_2$ of microcell A, the mobile telephone gets little interference from microcell B. This concept can, of course, easily be generalized to many such FDMA channels.

Generalization to Multiple Microcells

Suppose that five microcells, denoted "A", "B", "C", "D" and "E", and each of these microcells use a different orthogonal code of 31 codewords each of 32 chips in length. These are five of the six codes described above.

In the area covered by the five microcells, for a given carrier frequency, there are a total of $5 \times 31 = 155$ active radio channels. Suppose for the moment that all five microcell base station radios have equal power at the receiving remote unit. Then the bit energy to noise ratio for the QUALCOM system is $$E_b/N_o = 0.42 = -3.81 \text{ dB}$$

while the Welch lower bound gives $$E_b/N_o \leq 0.52 = -2.87 \text{ dB}$$

The present invention described here has under the same condition the bit energy to noise ratio of $$E_b/N_o = 0.50 = -3.01 \text{ dB}$$

The more general situation is where any receiving remote unit sees different power levels from the five microcell base station radios. Let $P_A$, $P_B$, $P_C$, and $P_D$ be the power levels at the slave radio of the remote unit. If the remote unit has an active link with microcell A then it does not receive any interference from this microcell's base station and the equivalent bit energy to noise ratio is $$E_b/N_o = P_A/(P_B + P_C + P_D + P_E)$$

Recall that for a coded DS/QPSK the required bit energy to noise ratio to achieve a bit error rate of $10^{-3}$ is $E_b/N_o = 2$. Thus, if we use voice activation circuits then for this remote unit to maintain a good communication channel with microcell A it must have the condition $$P_A \geq P_B + P_C + P_D + P_E$$

This result applies to one carrier frequency. At another carrier frequency the power distribution of the five microcell base stations at the slave radio of the remote unit may be quite different. By using different power levels for each FDMA channel by each base station, all areas covered by the five microcells can have adequate power levels to achieve a good communication channel with at least one microcell at some carrier frequency.

In a radio network with many potentially interfering radios simultaneously transmitting in the same band, interference to any given radio is greatest from those with the most power at the receiving antenna of the radio. With equal power transmitters this usually means that the greatest interference comes from transmitters that are closest to the receiving radio. In the prior art all radios contribute the same correlation value while in the present invention the radios in the same microcell use orthogonal codes. Thus, the closest radios tend to have zero cross correlation and contribute no interference. Overall this results in a higher capacity system.

It will be apparent to those skilled in the art that various modifications can be made to the spread spectrum method of the instant invention without departing from the scope or spirit of the invention, and it is intended that the present invention cover modifications and variations of the spread spectrum method provided they come within the scope of the appended claims and their equivalents. Further, it is intended that the present invention cover present and new applications of the method of the present invention.

I claim:

1. A method for establishing and communicating synchronous, code division multiple access communications on a same frequency between a base station and a plurality of remote units, with a plurality of remote-communications signals having spread-spectrum modulation from the plurality of remote units arriving simultaneously at said base station, the method for each accessing-remote unit comprising the steps of:

transmitting repetitively from said base station an access signal having spread-spectrum modulation;

receiving the access signal at said access-remote unit;

transmitting responsive to the access signal, from said accessing-remote unit, an echo signal having spread-spectrum modulation;

receiving the echo signal at said base station;

measuring a time delay at said base station between the access signal and the received echo signal;

transmitting a protocol signal having spread-spectrum modulation from said base station to said accessing-remote unit, with the protocol signal communicating a chip codeword and the time delay measured at said base station;

receiving the protocol signal at said accessing-remote unit;

adjusting at said accessing-remote unit a delay time such that the communications signal transmitted from said accessing-remote unit arrives simultaneously at said base station with communications signals transmitted from the plurality of remote units;

communicating from said base station to said plurality of remote units, with a plurality of base-communications signals having spread-spectrum modulation transmitted simultaneously from said base station, with each chip codeword of each base-communications signal orthogonal to chip codewords of the plurality of base-communications signals; and communicating from said plurality of remote units to said base station with the plurality of remote-communications signals having spread-spectrum modulation transmitted from said plurality of remote units, respectively, the plurality of remote-communications signals arriving simultaneously at said base station with each chip codeword of each remote-communications signal orthogonal to chip codewords of the plurality of remote-communications signals.

2. A method for communicating synchronous, code division multiple access communications between a base station and a plurality of remote units, with a plurality of remote-communication signals having spread-spectrum modulation from the plurality of remote units arriving simultaneously at said base station, comprising the steps of:

transmitting repetitively from said base station an access signal having spread-spectrum modulation;

receiving the access signal at said access-remote unit;

transmitting, responsive to the access signal, from said accessing-remote unit, an echo signal having spread-spectrum modulation;

receiving the echo signal at said base station;

measuring a time delay at said base station between the access signal and the received echo signal;

transmitting a protocol signal having spread-spectrum modulation from said base station to said accessing-remote unit, with the protocol signal communicating a chip codeword and the time delay measured at said base station;

receiving the protocol signal at said accessing-remote unit;

adjusting at said accessing-remote unit a delay time such that the communications signal transmitted from said accessing-remote unit arrives simultaneously at said base station with communications signals transmitted from the plurality of remote units; and communicating from said base station to said plurality of remote units, with a plurality of base-communications signals having spread-spectrum modulation transmitted simultaneously from said base station.

3. A method for establishing synchronous, code division multiple access communications between a base station and a plurality of remote units, with a plurality of remote-communications signals having spread-spectrum modulation from the plurality of remote units arriving simultaneously at said base station, the method for each accessing-remote unit comprising the steps of:

transmitting repetitively from said base station an access signal having spread-spectrum modulation;

receiving the access signal at said accessing-remote unit;

transmitting responsive to the access signal, from said accessing-remote unit, an echo signal having spread-spectrum modulation;

receiving the echo signal at said base station;

measuring a time delay at said base station between the access signal and the received echo signal;

transmitting a protocol signal having spread-spectrum modulation from said base station to said accessing-remote unit, with the protocol signal communicating the time delay measured at said base station;

receiving the protocol signal at said accessing-remote unit; and adjusting at said accessing-remote unit a delay time such that the communications signal transmitted from said accessing-remote unit arrives simultaneously at said base station with communications signals transmitted from the plurality of remote units.

4. A method for establishing and communicating synchronous, code division multiple access communications on a same frequency between a base station and a plurality of remote units, with a plurality of remote-communication signals having spread-spectrum modulation from the plurality of remote units arriving simultaneously at said base station, the method for each accessing-remote unit comprising the steps of:

transmitting repetitively from said base station an access signal having spread-spectrum modulation;

receiving the access signal at said access-remote unit;

transmitting, responsive to the access signal, from said accessing-remote unit, an echo signal having spread-spectrum modulation;

receiving the echo signal at said base station;

measuring a time delay at said base station between the access signal and the received echo signal;

transmitting a protocol signal having spread-spectrum modulation from said base station to said accessing-remote unit, with the protocol signal communicating a chip codeword and the time delay measured at said base station;

receiving the protocol signal at said accessing-remote unit;

adjusting at said accessing-remote unit a delay time such that the communications signal transmitted from said accessing-remote unit arrives simultaneously at said base station with communications signals transmitted from the plurality of remote units;

communicating from said base station to said plurality of remote units, with a plurality of base-communication signals having spread-spectrum modulation transmitted simultaneously from said base station; and communicating from said plurality of remote units to said base station with the plurality of remote-communication signals having spread-spectrum modulation transmitted from said plurality of remote units, respectively, the plurality of remote-communication signals arriving simultaneously at said base station.

5. A method for communicating synchronous, code division multiple access communications on a same frequency between a base station and a plurality of remote units, the method comprising the steps of:

transmitting repetitively from said base station an access signal having spread-spectrum modulation;

receiving the access signal at said access-remote unit;

transmitting, responsive to the access signal, from said accessing-remote unit, an echo signal having spread-spectrum modulation;

receiving the echo signal at said base station;

measuring a time delay at said base station between the access signal and the received echo signal;

transmitting a protocol signal having spread-spectrum modulation from said base station to said accessing-remote unit, with the protocol signal communicating a chip codeword and the time delay measured at said base station;

receiving the protocol signal at said accessing-remote unit;

adjusting at said accessing-remote unit a delay time such that the communications signal transmitted from said accessing-remote unit arrives simultaneously at said base station with communications signals transmitted from the plurality of remote units; and communicating from said plurality of remote units to said base station with the plurality of remote-communication signals having spread-spectrum modulation transmitted from said plurality of remote units, respectively, the plurality of remote-communication signals arriving simultaneously at said base station.

6. A method for establishing and communicating synchronous, code division multiple access communications on a same frequency between a base station and a plurality of remote units, with a plurality of remote-communication signals having spread-spectrum modulation from the plurality of remote units arriving simultaneously at said base station, the method for each accessing-remote unit comprising the steps of:

transmitting an access signal;
receiving the access signal;
transmitting an echo signal;
receiving the echo signal;
measuring a time delay between the access signal and the received echo signal;
transmitting a protocol signal;
receiving the protocol signal; and
adjusting a delay time.

7. The method as set forth in claim 6, further comprising the step of:

communicating from said plurality of remote units to said base station with the plurality of remote-communication signals having spread-spectrum modulation transmitted from said plurality of remote units, respectively, the plurality of remote-communication signals arriving simultaneously at said base station.

8. The method as set forth in claim 6, further comprising the step of:

communicating from said base station to said plurality of remote units.

9. The method as set forth in claim 7, further comprising the step of:

communicating from said base station to said plurality of remote units.

10. A system for communicating synchronous, code division multiple access communications on a same frequency between a base station and a plurality of remote units, with a plurality of remote-communication signals having spread-spectrum modulation from the plurality of remote units arriving simultaneously at said base station, the system comprising:

a base station for transmitting simultaneously a plurality of base-communication signals having spread-spectrum modulation; and a plurality of remote units for transmitting simultaneously a plurality of remote-communication signals having spread-spectrum modulation;

wherein each remote unit receives an access signal, each remote unit transmits an echo signal having spread-spectrum modulation, each remote unit receives a protocol signal, each remote unit adjusts a delay time such that the remote-communication signals transmitted from each remote unit arrives simultaneously at said base station with the remote-communication signals transmitted from the plurality of remote units.

11. A system for establishing and communicating synchronous, code division multiple access communications on a same frequency between a base station and a plurality of remote units, with a plurality of remote-communication signals having spread-spectrum modulation from the plurality of remote units arriving simultaneously at said base station, the system comprising:

a base station, said base station transmitting repetitively an access signal having spread-spectrum modulation, said base station receiving an echo signal having spread-spectrum modulation, said base station measuring a time delay between the access signal and the received echo signal, said base station transmitting a protocol signal having spread-spectrum modulation; and a plurality of remote units, each remote unit receiving the access signal, each remote unit transmitting the echo signal having spread-spectrum modulation, each remote unit receiving the protocol signal, each remote unit adjusting a delay time such that the remote-communication signal transmitted from each remote unit arrives simultaneously at said base station with the remote-communication signals transmitted from the plurality of remote units.

12. A system for communicating synchronous, code division multiple access communications on a same frequency between a base station and a plurality of remote units, comprising:

a base station, said base station transmitting repetitively an access signal having spread-spectrum modulation, said base station receiving an echo signal having spread-spectrum modulation, said base station measuring a time delay between the access signal and the received echo signal, said base station transmitting a protocol signal having spread-spectrum modulation; and a plurality of remote-units;

wherein said plurality of remote units communicate to said base station with a plurality of remote-communication signals having spread-spectrum modulation transmitted from said plurality of remote units, respectively, the plurality of remote-communication signals arriving simultaneously at said base station.

13. The system as set forth in claim 12, wherein said base station communicates to said plurality of remote units, with a plurality of base-communication signals having spread-spectrum modulation transmitted simultaneously from said base station.

* * * * *